United States Patent
Burggrabe et al.

(10) Patent No.: US 7,107,720 B2
(45) Date of Patent: Sep. 19, 2006

(54) DIVING FISHING LURES

(75) Inventors: Robert A. Burggrabe, Eufaula, AL (US); Michael E. McPherson, Eufaula, AL (US)

(73) Assignee: Mann's Bait Company, Eufaula, AL (US)

( * ) Notice: Subject to any disclaimer, the term of this patent is extended or adjusted under 35 U.S.C. 154(b) by 0 days.

(21) Appl. No.: 10/652,699

(22) Filed: Aug. 29, 2003

(65) Prior Publication Data

US 2005/0044771 A1    Mar. 3, 2005

(51) Int. Cl.
*A01K 85/00* (2006.01)
(52) U.S. Cl. .................................... 43/42.47
(58) Field of Classification Search ............. 43/42.47, 43/42.35, 42.48, 42.49, 42.22
See application file for complete search history.

(56) References Cited

U.S. PATENT DOCUMENTS

| | | | | |
|---|---|---|---|---|
| 1,220,921 A * | 3/1917 | Wilson | ......... | 43/42.22 |
| 1,232,211 A * | 7/1917 | Burkman | ......... | 43/42.22 |
| 1,499,819 A * | 7/1924 | Goble | ......... | 43/42.47 |
| 2,159,591 A * | 5/1939 | Leusch et al. | ......... | 43/42.47 |
| 2,277,453 A * | 3/1942 | Phillips | ......... | 43/42.48 |
| 2,494,384 A * | 1/1950 | Gadzinski et al. | ......... | 43/42.22 |
| 2,580,733 A * | 1/1952 | Cowden | ......... | 43/42.47 |
| 2,604,717 A * | 7/1952 | Henry | ......... | 43/42.47 |
| 2,611,207 A * | 9/1952 | Pond | ......... | 43/42.47 |
| 2,700,809 A * | 2/1955 | Caldwell | ......... | 43/42.47 |
| 2,945,318 A * | 7/1960 | Lassiter | ......... | 43/42.47 |
| 3,745,685 A * | 7/1973 | Swarthout | ......... | 43/42.35 |
| 4,215,507 A * | 8/1980 | Russell | ......... | 43/42.47 |
| 4,223,469 A * | 9/1980 | Luz | ......... | 43/42.35 |
| 4,445,294 A * | 5/1984 | Gowing | ......... | 43/42.47 |
| 4,739,576 A * | 4/1988 | Davis | ......... | 43/42.47 |
| 4,777,761 A * | 10/1988 | Renaud | ......... | 43/42.47 |
| 4,807,387 A * | 2/1989 | Dougherty et al. | ......... | 43/42.22 |
| 4,807,388 A * | 2/1989 | Cribb | ......... | 43/42.47 |
| 4,819,365 A * | 4/1989 | Landuydt | ......... | 43/42.47 |
| 4,944,112 A * | 7/1990 | Garmany et al. | ......... | 43/42.47 |
| 5,038,512 A * | 8/1991 | Gaal | ......... | 43/42.47 |
| 5,168,652 A * | 12/1992 | Davis | ......... | 43/42.49 |
| 5,490,347 A * | 2/1996 | Conley | ......... | 43/42.47 |
| 5,560,143 A * | 10/1996 | Allen | ......... | 43/42.47 |
| 5,566,496 A * | 10/1996 | Rutherford et al. | ......... | 43/42.47 |
| 5,600,916 A * | 2/1997 | Smith | ......... | 43/42.47 |
| 5,661,921 A * | 9/1997 | Mason | ......... | 43/42.47 |
| 5,678,349 A * | 10/1997 | Pacora | ......... | 43/42.35 |
| 5,937,569 A * | 8/1999 | Solheim et al. | ......... | 43/42.47 |
| 6,079,145 A * | 6/2000 | Barringer | ......... | 43/42.22 |
| 6,101,758 A * | 8/2000 | Finley | ......... | 43/42.22 |
| 6,484,434 B1 * | 11/2002 | Elges | ......... | 43/42.47 |
| 6,578,313 B1 * | 6/2003 | Knol | ......... | 43/42.47 |
| 6,931,784 B1 * | 8/2005 | Sutherland | ......... | 43/42.22 |
| 2004/0006909 A1 * | 1/2004 | Essad | ......... | 43/42.22 |

* cited by examiner

*Primary Examiner*—Darren W. Ark
(74) *Attorney, Agent, or Firm*—Alston & Bird LLP

(57) ABSTRACT

The present invention provides an improved diving fishing lure having a more durable and stable design that is capable of assisting today's fishermen as they target fish at increasingly greater depths and at faster trolling or retrieval speeds. The fishing lure includes a lure body having first and second ends, at least one fish hook extending from the lure body, and a diving lip extending from the first end of the lure body. According to one embodiment, the fishing lure includes a connector mounted to the diving lip, wherein the diving lip defines a recessed surface at least partially around the connector having a sidewall with a radius of approximately 0.30 inches to approximately 0.40 inches.

11 Claims, 4 Drawing Sheets

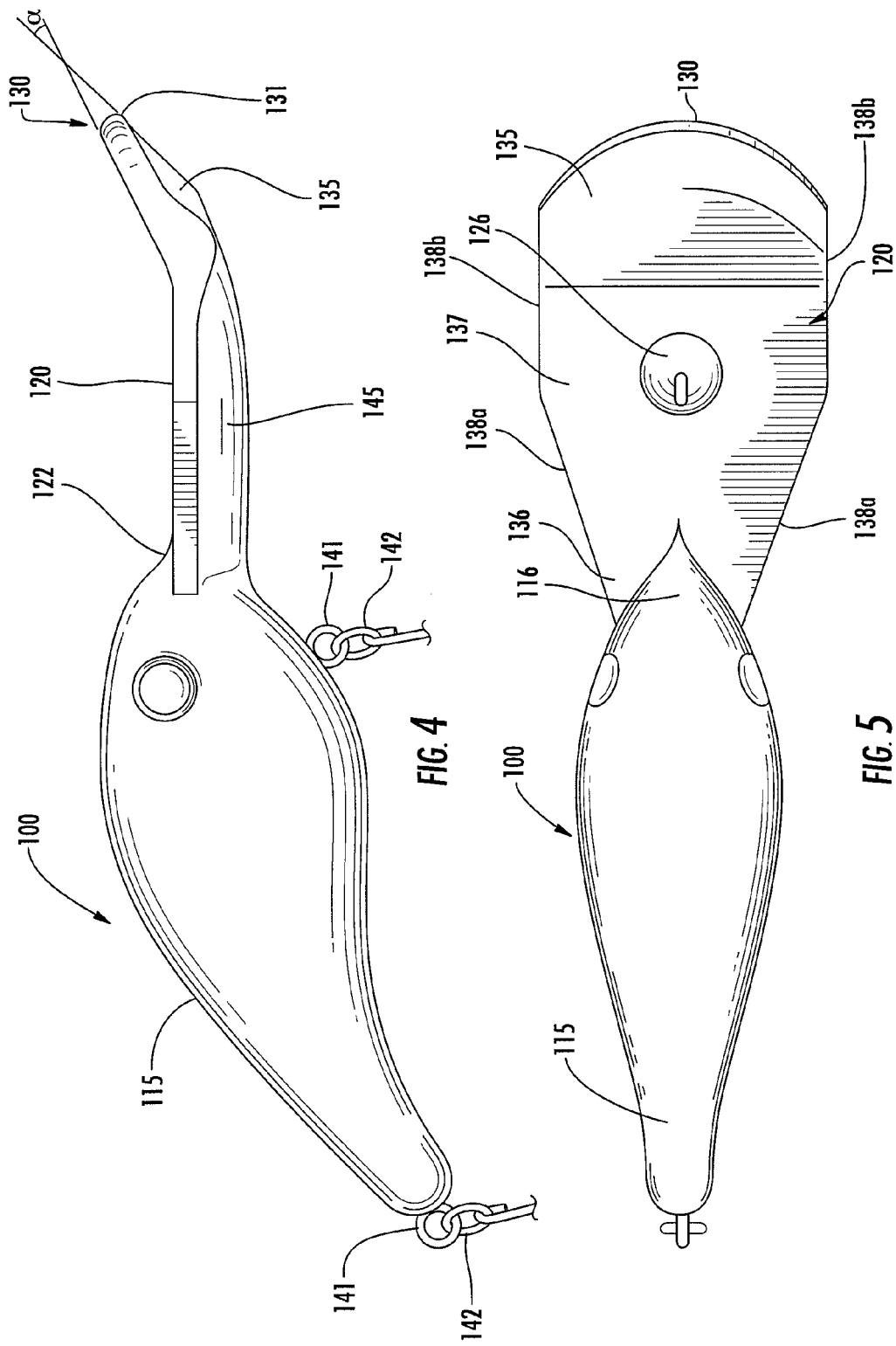

DIVING FISHING LURES

BACKGROUND OF THE INVENTION

1. Field of the Invention

This invention relates generally to fishing lures, more particularly to a diving fishing lure having improved structural durability and trolling stability.

2. Description of Related Art

Many fishermen prefer to target fish that do not normally strike bait floating on the surface. To attract such fish, fishermen use lures designed to dive beneath the surface of the water.

Referring to FIGS. 1 and 2, conventional diving lures 10 have a lure body 15 supporting one or more fish hooks 40 and a diving plate or lip 20 that extends forwardly from the front end 16 of the lure body. The lure is typically connected to a fishing line or leader 11 through a connector 25 mounted along the centerline of the diving lip 20. The connector 25 is typically mounted within a recess area 26 having substantially vertical sidewalls. The diving lips 20 are generally angled downwardly relative to the lure body 15 so that as the lure 10 is retrieved, the water flowing over the diving lip exerts a downward diving force on the lip thereby causing the lure to dive.

Diving lures are typically buoyant, but, as discussed above, are designed to dive below the surface of the water when the lure is pulled or trolled through the water. When using a diving lure, the fisherman first casts the lure, and then retrieves the lure using a reel. Alternatively, the lure is pulled or trolled behind a moving boat. The forward motion of the diving lure through the water generates a downward force on the lure that forces the lure deeper into the water as it is retrieved or trolled until an equilibrium is reached between the downward force exerted by the water on the diving lip and the buoyancy of the lure body, which buoyancy increases proportionately as the depth of the lure increases.

As today's fishermen target fish at increasingly greater depths, within more specific depth ranges, and/or at faster trolling or retrieval speeds, it has become evident that there are a number of problems associated with conventional diving lures. For example, conventional diving lures generally exhibit high stress concentrations where the diving lip connects to the lure body and where the connector for securing the fishing line is mounted to the diving lip. These stress concentrations can reduce the ability of a diving lure to withstand the forces applied to the lure when hooking and retrieving large fish, when fishing at extreme depths, or when trolling at high speeds. Another problem associated with conventional diving lures is that the lures do not exhibit the desired swimming motion or "action" when the lure is used at extreme depths or at high trolling or retrieval speeds.

Accordingly, it is desirable then to produce an improved diving fishing lure having a more robust and durable design that is capable of assisting today's fishermen as they target fish at increasingly greater depths and at faster trolling or retrieval speeds. Further, it is desirable to produce an improved diving lure providing more stable and realistic action for attracting fish.

SUMMARY OF THE INVENTION

The present invention provides an improved diving fishing lure having a more durable and stable design that is capable of assisting today's fishermen as they target fish at increasingly greater depths and at faster trolling or retrieval speeds. The fishing lure includes a lure body having first and second ends, at least one fish hook extending from the lure body, and a diving lip extending from the first end of the lure body. The fishing lure can include one or more features to improve the durability and/or hydrodynamic stability of the fishing lure.

According to one embodiment of the present invention, the fishing lure includes a connector mounted to the diving lip, wherein the diving lip defines a recessed surface at least partially around the connector having a sidewall with a radius of approximately 0.30 inches to approximately 1.0 inches and, preferably, approximately 0.30 inches to approximately 0.75 inches and, more preferably, approximately 0.50 inches to approximately 0.75 inches. According to another embodiment of the present invention, the diving lip and the lure body define a transition region having a radius of approximately 0.02 inches to approximately 0.25 inches and, more preferably, approximately 0.01 inches to approximately 0.30 inches. According to another embodiment, the diving lip defines an edge portion having a radius of approximately 0.05 inches to approximately 1.0 inches and, more preferably, approximately 0.065 inches to approximately 0.36 inches. According to another embodiment, the diving lip and lure body are structured to dive to a depth of approximately 30 feet, wherein the diving lip defines an edge portion having a surface area of between approximately 0.10 inches to approximately 0.125 inches. According to still another embodiment, the diving lip defines first and second ends and an intermediary region therebetween, wherein the intermediary region defines at least two pair of substantially planar lateral edges.

Thus, there is provided an improved diving fishing lure having a more robust and durable design that is capable of assisting today's fishermen as they target fish at increasingly greater depths and at faster trolling or retrieval speeds. Advantageously, the improved diving lure also provides more stable and realistic action for attracting fish.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 4 is a side view of a diving fishing lure, in accordance with another embodiment of the present invention;

FIG. 5 is a top view of a diving fishing lure, in accordance with yet another embodiment of the present invention.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
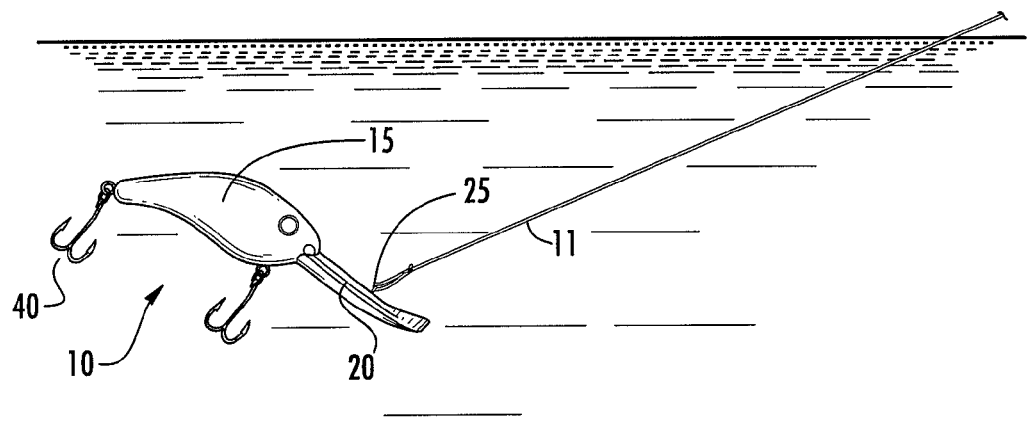
FIG. 1 is an elevated side view illustrating a diving fishing lure, as known in the art.
Figure 2:
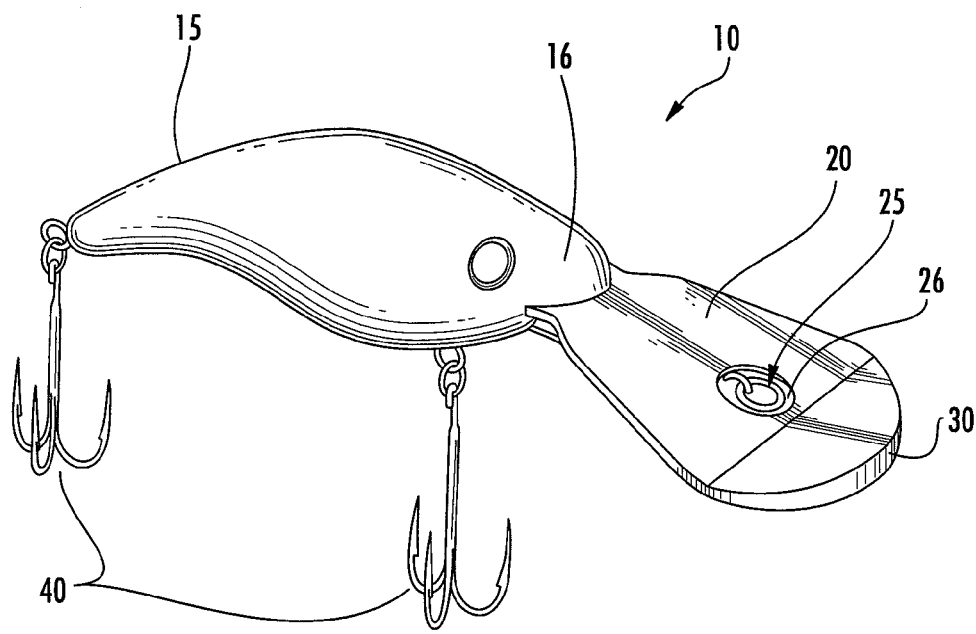
FIG. 2 is an enlarged isometric view illustrating the diving fishing lure of FIG. 1.
Figure 3:
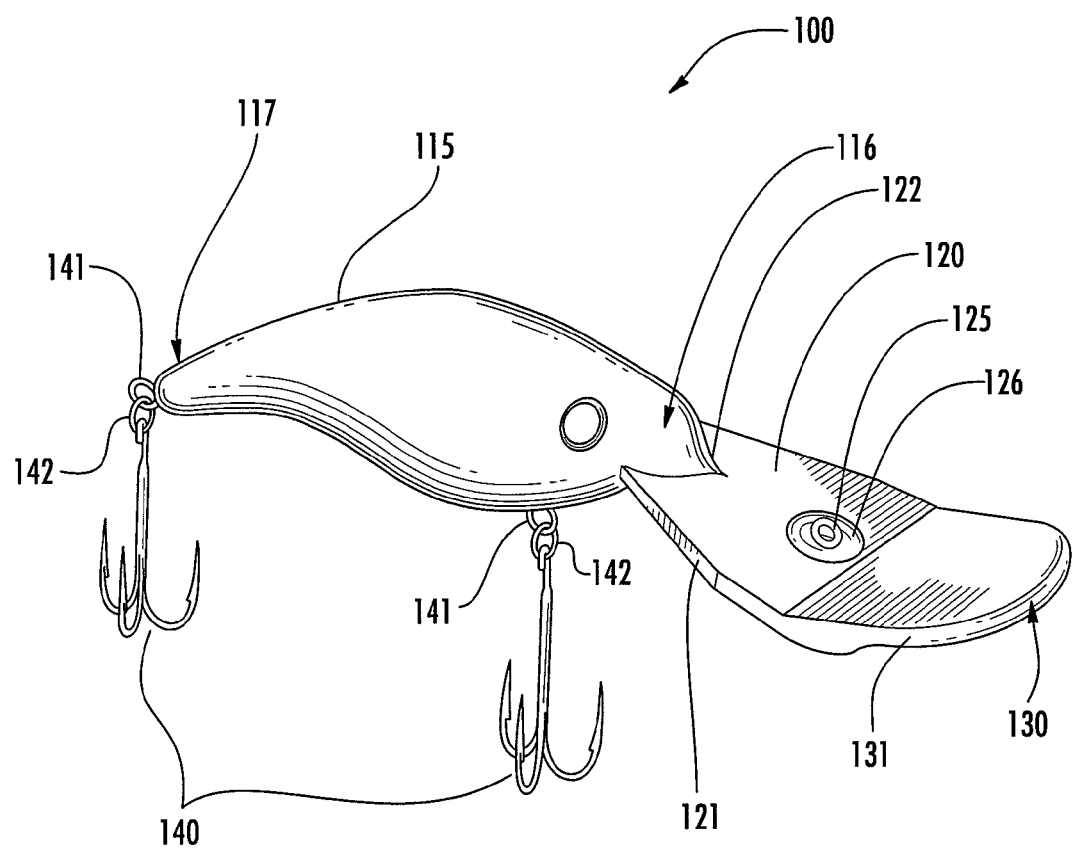
FIG. 3 is an enlarged isometric view of a diving fishing lure, in accordance with one embodiment of the present invention.
Figure 6:
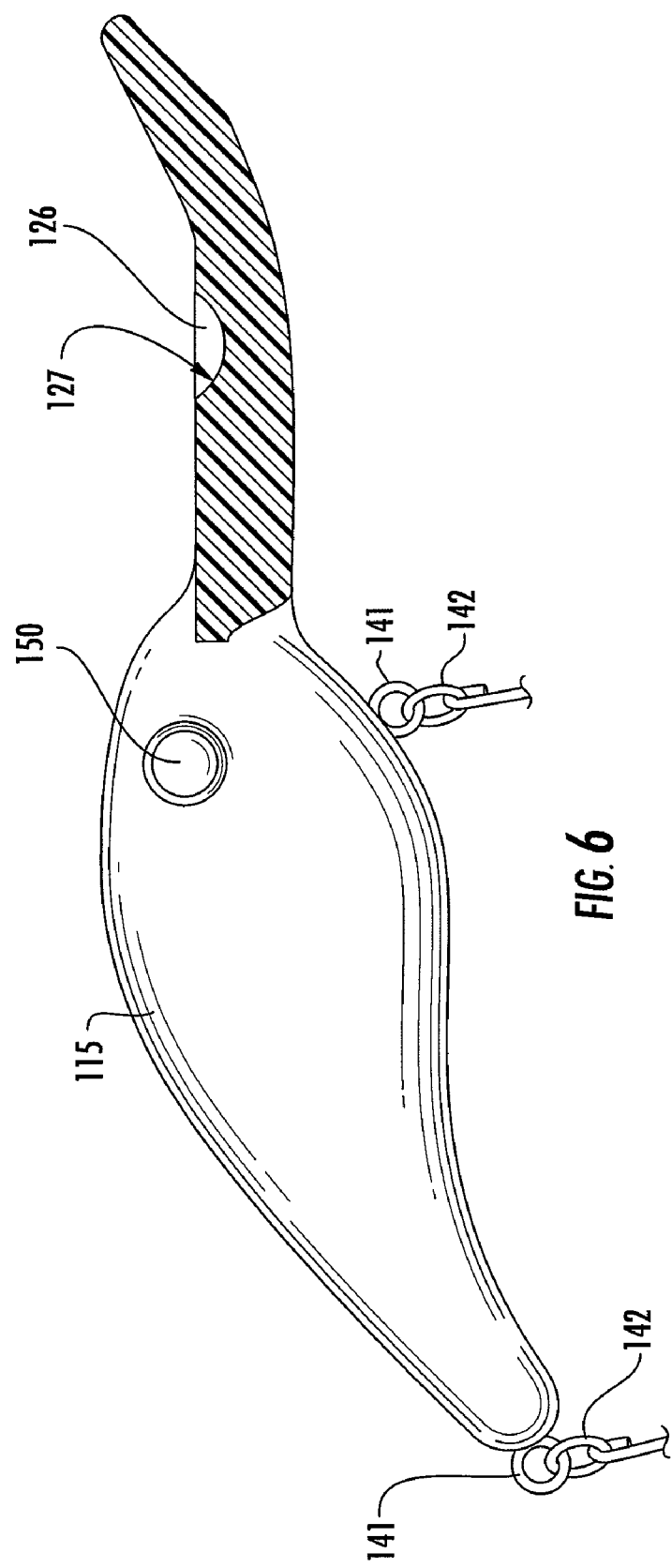
FIG. 6 is a partial section view illustrating a recessed area for a connector, in accordance with another embodiment of the present invention.

Referring to FIG. 3, there is illustrated a diving fishing lure 100, in accordance with one embodiment of the present invention. According to this embodiment, the fishing lure 100 includes a lure body 115 having first and second ends 116, 117. As illustrated in FIG. 6, the lure body 115 preferably includes at least one fish attracting element 150. Such fish attracting elements 150 may include attractive or realistic coloring, fish eyes, scales, fins, and the like.

A diving lip 120 extends from the first end 116 of the lure body 115. The diving lip 120 defines first and second ends 135, 136 and an intermediate portion 137 therebetween. As illustrated in FIG. 5, the intermediary region 137 defines at least two pair of substantially planar lateral edges 138a, 138b, which have been found to improve the durability and hydrodynamic performance of the fishing lure. While the size and dimension of the fishing lures 100 and, thus the lure body 15 and diving lip 120 may vary, the fishing lures according to the present invention are preferably sized and structured to achieve predetermined diving depths based upon the buoyancy of the lure body and configuration of the diving lip.

The lure body 115 and diving lip 120 can be formed separately using known thermoplastic resins or like materials using known manufacturing techniques, such as extrusion or injection molding, and then joined together by bonding using an adhesive or by ultrasonic welding. Alternatively, a half of the lure body 115 and diving lip 120 are formed together as a first half while the other half of the lure body and diving lip are formed together as a second halve. Thereafter, the first and second halves can be joined together by bonding using an adhesive or by ultrasonic welding using high frequency. In other embodiments, the fishing lures 100 according to the present invention, may be carved from wood or other materials and fitted with components made from metals, plastics or other materials, provided the materials are corrosion resistant.

At least one fishing hook 140 extends from at least one of the first and second ends 116, 117 of the lure body 115, as is well known in the art. The embodiment illustrated in FIG. 3 shows two treble hooks 140, one extending from the first end 116 of the lure body 115 and the other extending from the second end 117 of the lure body. Other hooks 140 can include a single barbed hook or a double barbed hook, as well as hooks with four or more barbs. The lure body 115 preferably includes wireforms 141 inserted into the lure body at the time the body is formed, as is known in the art, for movably mounting the fishing hooks 140. The fishing hooks 140 can be mounted directly to the wireforms 141 or a swivel or metal loop 142 can extend therebetween.

According to one embodiment of the invention, as illustrated in FIG. 4, the lure body 115 and diving lip 120 define a transition region 122 where the diving lip is joined to the lure body. Conventional diving lure designs typically incorporate an angle of approximately 90 degrees between the lure body and the diving lip. In contrast, the transition region 122 according to the present invention reduces the stress concentrations associated with many prior art designs by incorporating a radius of approximately 0.01 inches to 0.30 inches. Further, the transition region 122 advantageously serves to improve hydrodynamic stability by providing a relative smooth and continuous transition for directing water from the upper surface of the diving lip 120 over the lure body 115.

According to another embodiment of the present invention, as illustrated in FIG. 4, the diving lip 120 defines an improved leading edge or edge portion 130 that includes a radius 131 of approximately 0.05 inches to approximately 1.0 inches and, more preferably, approximately 0.065 inches to approximately 0.36 inches. In contrast, conventional diving lure designs typically have a "blunt" leading edge with a radius sometimes exceeding 0.40 inches. The improved leading edge 130 design provides a reduced surface area and, thus, a more streamlined hydrodynamic profile, which results in greater lure stability at higher trolling speeds, better diving characteristics and reduced pressure on the end of the lure thus allowing easier retrieval.

For example, in one embodiment of the present invention that is structured to dive to a depth of approximately 30 feet, the diving lip 120 includes a leading edge 130 having a "surface area" of approximately 0.105 square inches to 0.125 square inches. The "surface area" of the leading edge 130 is measured by sectioning the diving lip at its point of maximum width and measuring the sectioned area. As the targeted diving depth of fishing lures 100 according to the present invention are increased from approximately 30 feet in increments of approximately 10 feet, the surface area of the diving lip 120 will increase between approximately 30% and approximately 35%. As the targeted diving depth of fishing lures 100 according to the present invention are decreased from approximately 30 feet in increments of approximately 10 feet, the surface area of the diving lip 120 will decrease between approximately 20% and approximately 25%. The leading edge 130 can further define a trailing angle $\alpha$ of approximately 30 to 40 degrees and more preferably, approximately 35 degrees, to ensure that the improved hydrodynamic profile is maintained over the first end 135 of the diving lip 120.

In addition, as illustrated in FIG. 4, the diving lip 120 may include a stabilizing rib 145 along the centerline of the diving lip 120, as is known in the art. According to one embodiment of the present invention, the stabilizing rib 145 has a radius of between approximately 1.10 inches and approximately 7.50 inches. The radius of the stabilizing rib 145 is proportional to the radius of the leading edge 130 and the thickness of the first end 135 of the diving lip. In this regard, as the radius of the stabilizing rib 145 decreases, the radius of the leading edge 130 and the thickness of the first end of the diving lip decrease. As the radius of the stabilizing rib 145 increases, the radius of the leading edge 130 and the thickness of the first end of the diving lip increase.

According to another embodiment of the present invention, as illustrated in FIGS. 5 and 6, the diving lip 120 defines a recessed surface 126 structured to at least partially receive the connector 125, which is used to attach the lure 100 to a fishing line or leader (not shown). The recessed surface 126 extends at least partially around the connector 125. The recessed surface 126 according to the present invention is improved in comparison to conventional diving lures. More specifically, the recessed surface in conventional diving lure designs typically incorporates sidewalls having an angle of approximately 90 degrees with the bottom surface. In contrast, the sidewall of the recessed surface 126 according to the present invention includes a radius of approximately 0.30 inches to approximately 1.0 inches and, preferably, approximately 0.30 inches to approximately 0.75 inches and, more preferably, approximately 0.50 inches to approximately 0.75 inches. The improved shape of the recessed surface 126 enhances the hydrodynamic stability of the lure 100 by providing a more continuous surface for reducing lure drag at high trolling speeds.

Accordingly, there has been provided an improved diving fishing lure having a more robust and durable design that is capable of assisting today's fishermen as they target fish at increasingly greater depths and at faster trolling or retrieval speeds. Advantageously, the improved diving lure also provides more stable and realistic action for attracting fish.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A fishing lure, comprising:
a lure body having first and second ends and a topside and an underside;
at least one fish hook extending from said lure body; and
a diving lip having a distal end away from said lure body, said diving lip having first and second lateral edges extending from said first end of said lure body to said distal end of said diving lip, each of said first and second lateral edges intersecting said first end of said lure body at an intersection point, said diving lip having a topside corresponding to said topside of said lure body and an underside corresponding to said underside of said lure body; and
wherein said lure body defines a transition region on said topside of said lure body adjacent said diving lip comprising a concave portion having a radius of approximately 0.02 inch to approximately 0.25 inch that faces toward said distal end of said diving lip, said transition region having first and second ends, said first end of said transition region being positioned between said diving lip and a plane extending between said intersection points defined by said first and second lateral edges of said diving lip and said first end of said lure body, and wherein said second end of said transition region terminates at said topside of said diving lip to thereby improve the durability and hydrodynamic performance of the fishing lure.

2. A fishing lure as recited in claim 1 wherein said diving lip defines an edge portion having a radius of approximately 0.05 inch to approximately 1.0 inch.

3. A fishing lure as recited in claim 1 wherein said lure body comprises at least one fish attracting element.

4. A fishing lure as recited in claim 1 wherein said diving lip comprises a stabilizing rib positioned along the centerline of said diving lip having a radius of between approximately 1.10 inches and approximately 7.5 inches.

5. A fishing lure as recited in claim 1 wherein said lure body and said diving lip are structured to have a predetermined diving dept.

6. A fishing lure as recited in claim 5 wherein said diving lip and said lure body are structured to dive to a depth of approximately 30 feet, and wherein said diving lure defines an edge portion having a surface area of between approximately 0.105 inch to approximately 0.125 inch.

7. A fishing lure as recited in claim 1 wherein said diving lip defines an edge portion having a trailing angle of approximately 30 degrees to approximately 40 degrees.

8. A fishing lure, comprising:
a lure body having first and second ends;
at least one fish hook extending from said lure body;
a connector;
a diving lip extending from said first end of said lure body, said diving lip defines first and second ends, said first end being at said lure body and said second end being away from said lure body, said diving lip defining a recessed surface having an edge, said connector extending from said recessed surface, said recessed surface having a first edge portion comprising the portion of the edge of said recessed surface that is the shortest distance along the length of said diving lip from said lure body and a second edge portion comprising the portion of the edge of said recessed surface that is the longest distance alone the length of said diving lip from said lure body; and
wherein said diving lip defines a first pair and a second pair of planar, straight and contiguous lateral edges, wherein each of said first pair of lateral edges extends from said lure body and intersects a corresponding one of said second pair of lateral edges at an intersection point, each of said intersection points is located along the length of said diving lip at a position that is between the distance along the length of said diving lip defined by said first edge portion and the distance along the length of said diving lip defined by said second edge portion, and wherein said contiguous lateral edges of said first pair are disposed at an obtuse angle relative to said contiguous lateral edges of said second pair such that said second end of said diving lip is substantially wider than said first end of said diving lip to thereby improve the durability and the hydrodynamic performance of the fishing lure, wherein said diving lip defines an edge portion having a surface area of between approximately 0.105 inch to approximately 0.125 inch and wherein said diving lip and said lure body are structured to dive to a depth of approximately 30 feet.

9. A fishing lure as recited in claim 8 wherein said lure body defines at least one fish attracting element.

10. A fishing lure as recited in claim 8 wherein said diving lip comprises a stabilizing rib positioned along the centerline of said diving lip.

11. A fishing lure as recited in claim 8 wherein said diving lip edge portion has a trailing angle of approximately 30 degrees to approximately 40 degrees.

* * * * *